United States Patent [19]

Comerci et al.

[11] Patent Number: 5,380,951
[45] Date of Patent: Jan. 10, 1995

[54] CONVENIENCE OUTLET ASSEMBLY FOR ELECTRICAL WIRING

[75] Inventors: Joseph D. Comerci, Elmhurst; Mark M. Data, Bolingbrook; Robert DeRoss, Naperville, all of Ill.

[73] Assignee: Molex Incorporated, Lisle, Ill.

[21] Appl. No.: 82,216

[22] Filed: Jun. 24, 1993

[51] Int. Cl.⁶ ............................................. H01R 13/60
[52] U.S. Cl. .................................... 174/48; 220/319; 439/535; 439/571
[58] Field of Search .................... 174/48; 220/3.4, 3.5, 220/3.6, 3.9; 439/492, 499, 535, 571

[56] References Cited

U.S. PATENT DOCUMENTS

| | | | |
|---|---|---|---|
| 3,620,404 | 11/1971 | Grasso | 174/48 X |
| 4,500,746 | 2/1985 | Meehan | 174/48 |
| 5,064,386 | 11/1991 | Dale et al. | 439/535 |
| 5,097,099 | 3/1992 | Miller | 174/36 |
| 5,117,122 | 5/1992 | Hogarth et al. | 439/535 X |
| 5,188,541 | 2/1993 | Comerci et al. | 439/499 X |

Primary Examiner—Leo P. Picard
Assistant Examiner—D. A. Tone
Attorney, Agent, or Firm—Stephen Z. Weiss

[57] ABSTRACT

A convenience outlet assembly is adapted for interconnecting electrical components to wires in a flat cable extending behind a wall in a structure. A mounting bracket is secured to a structural support behind the wall and has a peripheral frame about a mounting opening. A cable tap subassembly is attachable to the cable. A mounting box, separate from the mounting bracket, has an open front face and a peripheral flange attachable to the peripheral frame of the mounting bracket. The peripheral flange is located on the exterior of the wall and the peripheral frame is located on the interior of the wall. The mounting box is insertable through an opening in the wall and the mounting opening in the bracket. The cable tap subassembly is mountable in a position at the rear of the box. A receptacle is defined by a pair of opposing channels between which the cable tap subassembly is positionable at the rear of the box, whereby the cable tap subassembly is mounted to the box without the use of any extraneous mounting apparatus or processes.

13 Claims, 3 Drawing Sheets

CONVENIENCE OUTLET ASSEMBLY FOR ELECTRICAL WIRING

FIELD OF THE INVENTION

This invention generally relates to the art of electrical interconnections and, particularly, to a convenience outlet assembly for interconnecting electrical components to wires in a cable extending behind a wall in a structure.

BACKGROUND OF THE INVENTION

In frame structures, such as houses, electrical wiring is located behind wall panels, such as dry wall panels. Conventionally, the wiring is deployed prior to mounting the wall panels to the framing studs. Applicable codes usually require that wall or outlet boxes must be secured to the studs. The boxes conventionally are nailed or screwed to the studs at predetermined locations prior to mounting the dry wall panels. The positions of the boxes are marked, and holes are cut in the panels. Thereafter, outlets, switches and other components are attached to the wiring and positioned within the outlet boxes. Face plates then are assembled to the front of the boxes.

It can be understood from the above building procedures that, once the dry wall is mounted to the framing studs, it is difficult, and usually impossible, to gain access to the wiring except through the holes in the dry wall panels at the predetermined positions for the outlet boxes. This is why some applicable codes require electrical wiring inspections and testing to be performed before installation of the dry wall panels. This problem is of normal acceptance in the building industry for conventional electrical wiring.

However, other problems have been encountered when multifunctional convenience outlet assemblies for so-called intelligent wiring systems are deployed. An intelligent wiring system may include both power conductors and data or signal conductors, for instance. Wiring for such systems has been provided by a hybrid ribbon or flat cable suitable for use in an intelligent wiring system for a building. Modules for connection to either or both the signal and power conductors are mounted in the outlet boxes.

It has become conventional for convenience outlet assemblies deployed with intelligent wiring systems to include a mounting bracket secured to a framing stud. A cable tap subassembly is attachable to the flat ribbon cable. The cable tap subassembly is mountable at the rear of a mounting box which is separate from the mounting bracket. A peripheral flange of the box is attachable to a peripheral frame of the bracket, with the peripheral flange on the outside of the wall panel and the peripheral frame on the interior of the wall panel. The mounting box is insertable through an opening in the wall and a mounting opening in the bracket.

One of the problems with convenience outlet assemblies for intelligent wiring systems, as described above, goes back to the general building procedures whereby the original wiring is completed prior to mounting the dry wall panels to the framing structure. Specifically, the cable tap subassemblies which are connectable to the hybrid ribbon cable are connected to the cable prior to mounting the dry wall panels, so that the wiring system can be continuity tested with the cable tap subassemblies prior to installation of the wall panels. Otherwise, if there were any breaks in continuity, the wall panels would have to be removed at considerable effort and expense.

Heretofore, the cable tap subassemblies of convenience outlet assemblies in intelligent wiring systems have been mounted in a position at the rear of the mounting box by such means as screws, heat stakes or other extraneous mounting apparatus and processes. This is a tedious and cumbersome procedure which must be performed by a technician through the small opening in the wall and the aligned openings in the mounting bracket and the mounting box. The bottom line is that, heretofore, convenience outlet assemblies for intelligent wiring systems have not been very "user friendly" in the field, both for original installation and subsequent field servicing.

This invention is directed to solving such problems in the field and satisfying the need of providing a convenience outlet assembly of the character described which is much more easy to assemble than the prior art.

SUMMARY OF THE INVENTION

An object, therefore, of the invention is to provide a convenience outlet assembly for interconnecting electrical components to a plurality of wires extending behind a wall in a structure, and particularly a wall box outlet assembly for a ribbon cable conventionally used in an intelligent wiring system for a building.

As disclosed herein, the convenience outlet assembly includes a mounting bracket secured to a structural support behind the wall and having a peripheral frame about a mounting opening. A cable tap subassembly is terminated to the cable. A mounting box, separate from the mounting bracket, has an open front face and a peripheral flange. The flange is attachable to the peripheral frame of the mounting bracket, with the peripheral flange on the exterior of the wall and the peripheral frame on the interior of the wall. The mounting box is insertable through an opening in the wall and the opening in the mounting bracket. The cable tap subassembly is mountable in a position at the rear of the mounting box.

The invention contemplates the provision of complementary interengaging mounting means between the cable tap subassembly and the mounting box for mounting the subassembly to the rear of the box automatically in response to locating the subassembly in its position at the rear of the box. The complementary interengaging mounting means eliminates the use of any extraneous mounting apparatus and processes, such as screws, bolts or heat staking.

In the exemplary embodiment of the invention, generally, the complementary interengaging mounting means are provided by a receptacle at the rear of the mounting box for receiving the cable tap subassembly. Specifically, the receptacle is formed by a pair of opposing channels between which the cable tap subassembly is positionable. In the preferred embodiment, the channels are vertically oriented and include inwardly directed supporting flanges on which the cable tap subassembly can rest when positioned between the channels. Latch means are provided on the channels to prevent the cable tap subassembly from being removed therefrom.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 3:
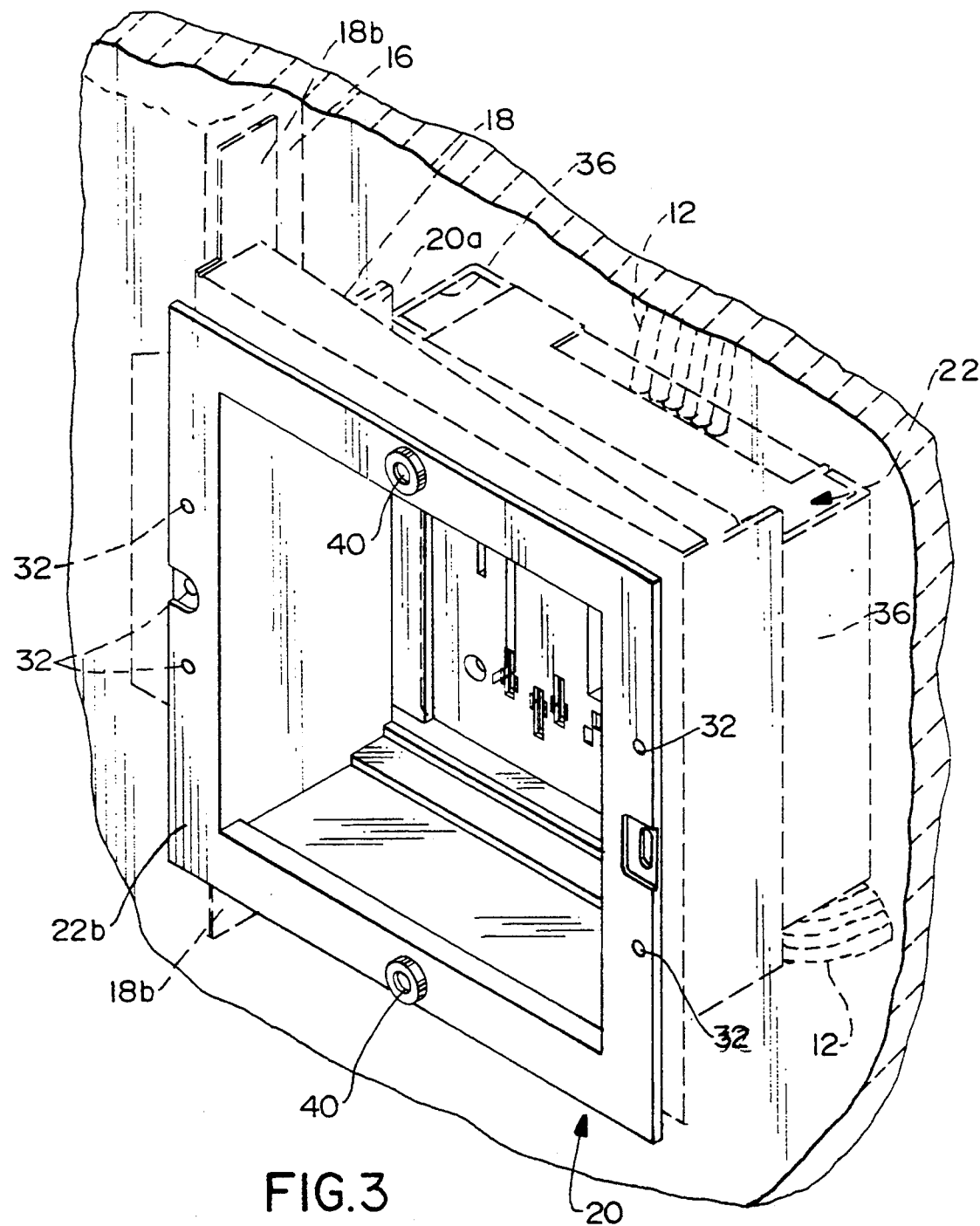
FIG. 3 is a perspective view of the assembled convenience outlet assembly of the invention.

Referring to the drawings in greater detail, the invention is incorporated in a convenience outlet assembly, generally designated 10 (FIG. 3) for interconnecting electrical components or modules (not shown) to wires of a flat ribbon cable 12 behind a wall in a structure. The wall may be in a light frame structure, such as a house, wherein dry wall panels 14 are mounted to framing studs 16. Flat cable 12 may be a hybrid ribbon cable as part of an intelligent wiring system and, thereby, the cable includes both power conductors or wires and data or signal conductors or wires.

Generally, convenience outlet assembly 10 includes a mounting bracket, generally designated 18, secured to a structural supporting stud 16; a mounting box, generally designated 20, securable to the bracket and sandwiching wall panel 14 therebetween; and a cable tap subassembly, generally designated 22, terminated to hybrid ribbon cable 12.

More particularly, mounting bracket 18 includes a center mounting flange 18a and a pair of ear-like mounting flanges 18b, with center flange 18a being in a plane perpendicular to flanges 18b so that the mounting bracket can be attached to a corner of stud 16. Holes 24 are provided in flange 18a and holes 26 are provided in flanges 18b and through which nails or screws are inserted to secure the bracket to the stud. A generally rectangular peripheral frame 18c projects from flanges 18a and 18b and defines a mounting opening 28 within the peripheral frame. Holes 30 are provided in the frame, for purposes described hereinafter. When bracket 18 is mounted to stud 16, peripheral frame 18c is located behind dry wall panel 14. As stated in the "Background", above, a hole is cut in the dry wall panel in registry with mounting opening 28 in bracket 18.

Figure 1:
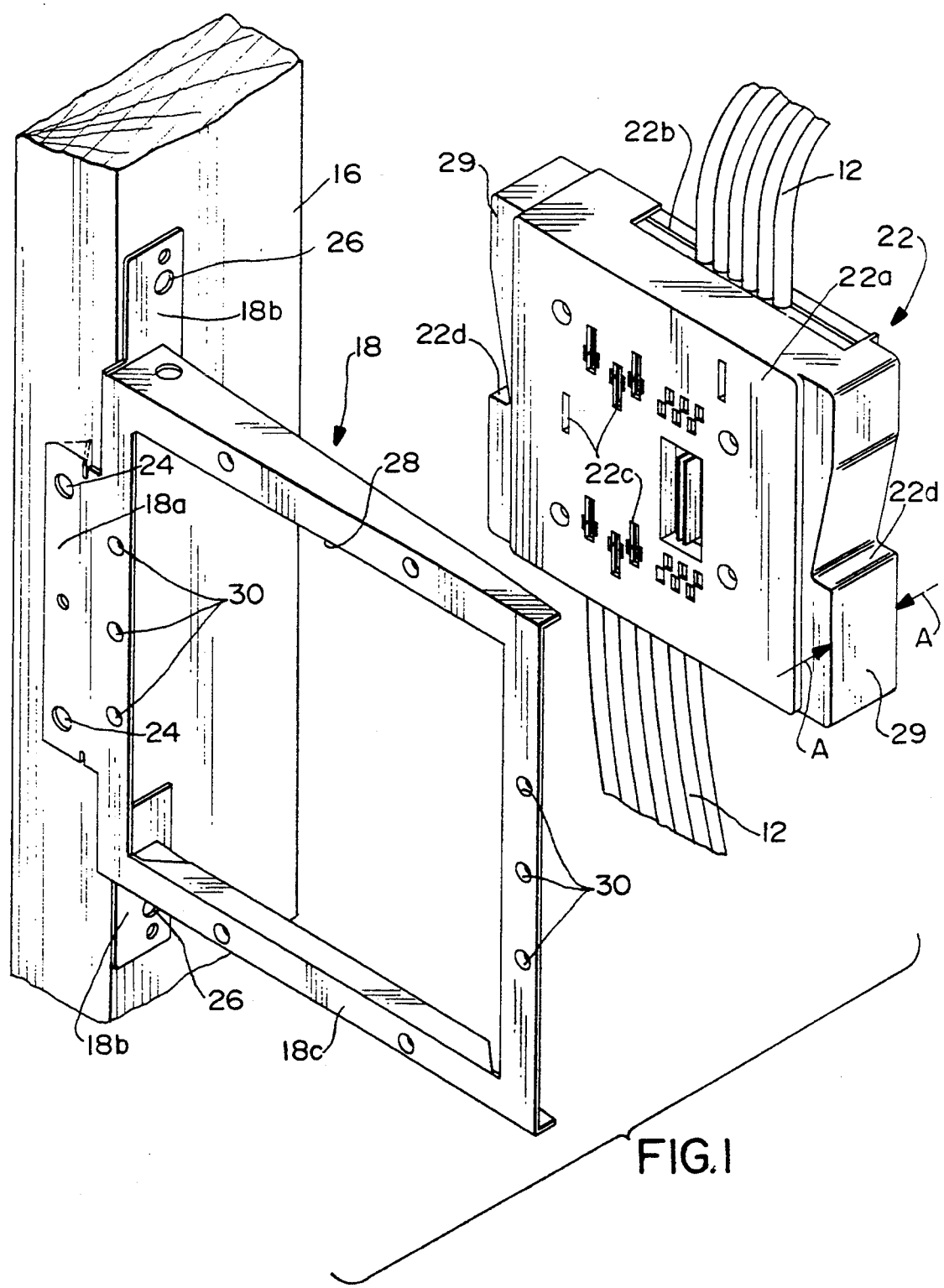
FIG. 1 is an exploded perspective view of the cable tap subassembly attached to a ribbon cable behind a mounting bracket attached to a framing stud.

Cable tap subassembly 22 has become a fairly standard type of component and includes a cable tap housing 22a and a generally flat cable clamp 22b for sandwiching or clamping ribbon cable 12 therebetween. As is known in the art, cable tap housing 22a includes insulation displacement terminals (not shown) for terminating the conductors within ribbon cable 12. Cable clamp 22b is effective to drive the conductors into the insulation displacement portions of the terminals. Cable tap housing 22a further includes appropriate apertures 22c for receiving contact prongs of various modular components (not shown) for interconnection with the conductors of the ribbon cable, as the cable tap subassembly 22 acts as the outlet means of convenience outlet assembly 10. Each opposite side or edge 29 of cable tap subassembly 22 has a given width as defined by arrows "A" (FIG. 1). Each opposite side or edge has a tapered, indented area which forms a latch shoulder or surface 22d, for purposes described hereinafter.

Mounting box 20 includes a U-shaped box portion 20a which is sized for insertion into mounting opening 28 of bracket 18. The mounting box has an open front face 31 and a peripheral flange 20b of a size and shape substantially the same as that of peripheral frame 18c of mounting bracket 18. The peripheral flange of the mounting box includes a plurality of holes 32 for receiving appropriate fasteners for attaching the peripheral flange to the peripheral frame of the bracket. For instance, holes 30 in the bracket may be internally threaded for receiving screws inserted into holes 32 of the mounting box. In full assembly (FIG. 3), box portion 20a of mounting box 20 is inserted into mounting opening 28 in bracket 18, and peripheral flange 20b of the mounting box is on the exterior of dry wall panel 14 and peripheral frame 18c of bracket 18 is on the interior of the panel.

Figure 2:
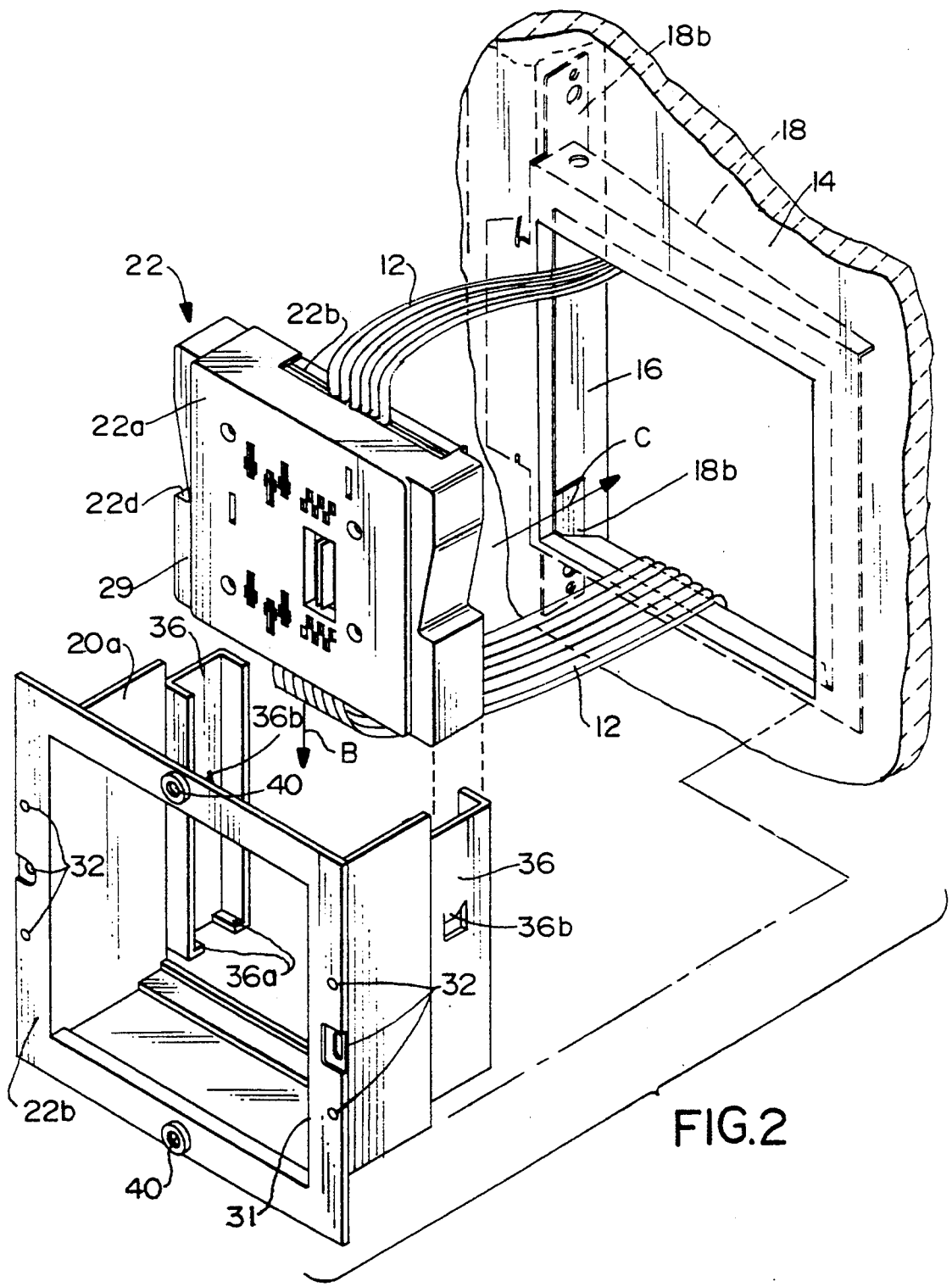
FIG. 2 is an exploded perspective view showing the cable tap subassembly and ribbon cable pulled through the mounting bracket in conjunction with the mounting box.

Generally, according to the invention, complementary interengaging mounting means are provided between mounting box 20 and cable tap subassembly 22 for mounting the subassembly to the rear of the box automatically in response to locating the subassembly in its position at the rear of the box, particularly without the use of any extraneous mounting apparatus or processes. More particularly, a pair of opposing channels 36 are provided in generally parallel, vertical orientations at the rear of mounting box 20. The widths of the channels are just slightly greater than the widths of the edges cable tap subassembly 22, as indicated by arrows "A" (FIG. 1). Therefore, the cable tap subassembly can be inserted into and between channels 26 as indicated by arrow "B" (FIG. 2). In essence, channels 36 provide a receptacle at the rear of mounting box 20 for receiving the cable tap subassembly. Inwardly directed flanges 36a are formed at the bottoms of the channels to provide a supporting surface means on which the cable tap subassembly can rest when positioned between the channels. The flanges also define stop limit means for insertion of the cable tap subassembly into the receptacle defined by the channels.

Lastly, latch means are provided to prevent movement of the cable tap subassembly out of channels 36. More particularly, a pair of inwardly directed latch tongues 36b are formed out of the channels for engaging latch shoulders 22d of the cable tap subassembly when the subassembly is fully inserted into the channels in the direction of arrow "B". The entire mounting box, or at least the channels secured to the rear thereof, preferably are fabricated of plastic material and, thereby, latch tongues 36b will have resiliency and effectively snap behind latch shoulders 22b of the cable tap subassembly when the subassembly is fully inserted into position between the channels.

The convenience outlet assembly 10 can be assembled in the following manner. First, referring to FIG. 1, cable tap subassembly 22 is clamped and terminated to hybrid ribbon cable 12 by first locating the clamp 22b about the cable and forcing the clamp and cable into the cable tap housing 22a so that the cable conductors are terminated to the insulation displacement terminals held in the housing 22a. Mounting bracket 18 is secured to a structural support behind a wall, such as securing flanges 18a and 18b to the corner of a stud 16. Before mounting the dry wall panels, circuit continuity testing can be performed on the intelligent wiring system by using cable tap subassembly 22.

Dry wall panel 14 then is secured to stud 16, the position of bracket 18 is marked and a hole, hopefully in alignment with mounting opening 28, is cut in the dry wall panel. Cable tap subassembly 22, already terminated to cable 12 is then pulled through opening 28 in bracket 18 and the hole in the wall, as shown in FIG. 2. The subassembly is simply positioned into the receptacle defined by channels 36 in the direction of arrow "B", and the assembled mounting box 20 and cable tap subassembly are moved back in the direction of arrow "C" through opening 28 in mounting bracket 18. When so positioned, peripheral flange 20b of the mounting box is located on the exterior of dry wall panel 14, and peripheral frame 18c of mounting bracket 18 is located on the interior of the panel. This is shown in the fully assembled condition of FIG. 3. Appropriate screws or other fasteners are inserted into holes 32 in peripheral flange 20b of the mounting box for securing the box, along with the cable tap subassembly, to mounting bracket 18, with the screws being inserted through the dry wall panel and into holes 30 in the bracket. Modules (not shown) then are mounted in the outlet assembly in systems which include means for connection to either or both the signal or power conductors of hybrid ribbon cable 12. A face plate (not shown) may be attached to peripheral flange 22b of mounting box 20, such as utilizing mounting holes 40.

It can be seen from the above-described assembly procedure, no extraneous mounting apparatus or processes, such as screws, bolts, heat stakes, and the like are required for assembling cable tap subassembly 22 to mounting box 20. The cable tap subassembly simply is slipped into the receptacle defined at the rear of the mounting box by opposing channels 36. Not only are extraneous mounting apparatus or devices totally eliminated, but tools required for prior assembly procedures also are eliminated.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a convenience outlet assembly for interconnecting electrical components to a plurality of wires extending behind a wall in a structure, said components being accessible to said outlet assembly through an opening in the wall, the assembly including a mounting bracket secured to a structural support behind the wall and having a peripheral frame about a mounting opening, a cable tap subassembly adapted to be terminated to the wires, and a mounting box, separate from the mounting bracket, having an open front face and a peripheral flange attachable to the peripheral frame of the mounting bracket with the peripheral flange on the exterior of the wall and the peripheral frame on the interior of the wall, the mounting box being insertable through the opening in the wall and the mounting opening in the bracket, the cable tap subassembly being mountable in a position at the rear of the box, wherein the improvement comprises complementary interengaging mounting means between the cable tap subassembly and the mounting box for mounting the subassembly to the rear of the box automatically in response to locating the subassembly in said position, without the use of any extraneous mounting apparatus and processes.

2. In a convenience outlet assembly as set forth in claim 1, wherein said complementary interengaging mounting means include a receptacle at the rear of the mounting box for receiving the cable tap subassembly.

3. In a convenience outlet assembly as set forth in claim 2, wherein said receptacle comprises a pair of opposing channels between which the cable tap subassembly is positionable.

4. In a convenience outlet assembly as set forth in claim 3, wherein said channels are vertically oriented, and including supporting surface means on which the cable tap subassembly can rest when positioned between the channels.

5. In a convenience outlet assembly as set forth in claim 4, wherein said supporting surface means comprise flanges at the bottom of the channels.

6. In a convenience outlet assembly as set forth in claim 4, including latch means on the channels to prevent the cable tap subassembly from being removed therefrom.

7. In a convenience outlet assembly as set forth in claim 1, including latch means to resist movement of the cable tap assembly out of said position.

8. In a convenience outlet assembly for interconnecting electrical components to wires extending behind a wall in a structure, the assembly including a mounting bracket secured to a structural support behind the wall, a cable tap subassembly adapted to be terminated to the wires, and a mounting box, separate from the mounting bracket, having an open front face registrable with a hole in the wall, the mounting box being adapted for attachment to the mounting bracket, and the cable tap subassembly being mountable in a position at the rear of the box, wherein the improvement comprises complementary interengaging mounting means between the cable tap subassembly and the mounting box for mounting the subassembly to the rear of the box automatically in response to locating the subassembly in said position, without the use of extraneous mounting apparatus and processes.

9. In a convenience outlet assembly as set forth in claim 8, wherein said complementary interengaging mounting means include a receptacle at the rear of the mounting box for receiving the cable tap subassembly.

10. In a convenience outlet assembly as set forth in claim 9, wherein said receptacle comprises a pair of opposing channels between which the cable tap subassembly is positionable.

11. In a convenience outlet assembly as set forth in claim 10, wherein said channels are vertically oriented, and including supporting surface means on which the cable tap subassembly can rest when positioned between the channels.

12. In a convenience outlet assembly as set forth in claim 11, including latch means on the channels to prevent the cable tap subassembly from being removed therefrom.

13. In a convenience outlet assembly as set forth in claim 8, including latch means to resist movement of the cable tap assembly out of said position.

* * * * *